United States Patent
Bracco et al.

(10) Patent No.: US 10,005,065 B2
(45) Date of Patent: Jun. 26, 2018

(54) ADSORBENT BASED ON A ZEOLITE AND A SILICA-RICH CLAY, AND PROCESS FOR PURIFYING HYDROCARBON FEEDS CONTAINING UNSATURATED MOLECULES

(71) Applicant: IFP ENERGIES NOUVELLES, Rueil-Malmaison (FR)

(72) Inventors: Emmanuelle Bracco, Condrieu (FR); Delphine Marti, Lyons (FR); Elsa Jolimaitre, Lyons (FR); Delphine Bazer-Bachi, Irigny (FR); Joseph Lopez, Saint Julien les Rosiers (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 341 days.

(21) Appl. No.: 14/296,490

(22) Filed: Jun. 5, 2014

(65) Prior Publication Data

US 2014/0364672 A1   Dec. 11, 2014

(30) Foreign Application Priority Data

Jun. 10, 2013   (FR) ..................... 13 55341

(51) Int. Cl.
| | |
|---|---|
| *B01J 20/30* | (2006.01) |
| *B01J 20/28* | (2006.01) |
| *C10G 25/03* | (2006.01) |
| *B01D 53/02* | (2006.01) |
| *B01J 20/18* | (2006.01) |
| *C10G 25/05* | (2006.01) |
| *B01J 20/12* | (2006.01) |

(52) U.S. Cl.
CPC .......... *B01J 20/3078* (2013.01); *B01D 53/02* (2013.01); *B01J 20/12* (2013.01); *B01J 20/183* (2013.01); *B01J 20/186* (2013.01); *B01J 20/2803* (2013.01); *B01J 20/3007* (2013.01); *C10G 25/03* (2013.01); *C10G 25/05* (2013.01); *B01D 2253/1085* (2013.01); *B01D 2253/11* (2013.01); *B01D 2256/24* (2013.01)

(58) Field of Classification Search
CPC ................................... B02J 20/3078
See application file for complete search history.

(56) References Cited

U.S. PATENT DOCUMENTS

| | | | |
|---|---|---|---|
| 3,816,975 | A | 6/1974 | Collins |
| 6,183,539 | B1 | 2/2001 | Rode et al. |
| 6,530,975 | B2 | 3/2003 | Rode et al. |
| 2001/0049998 | A1 | 12/2001 | Rode et al. |
| 2003/0171205 | A1* | 9/2003 | Jaussaud ................ B01D 53/02 |
| | | | 502/68 |

FOREIGN PATENT DOCUMENTS

| | | | |
|---|---|---|---|
| FR | 2206370 | A1 | 6/1974 |
| WO | 00/01478 | A1 | 1/2000 |
| WO | WO-2010/113173 | A2 * | 7/2010 ............. B01D 53/04 |

OTHER PUBLICATIONS

Search Report and Written Opinion from Priority Patent Application No. FR 13/55341 dated Feb. 28, 2014.

* cited by examiner

Primary Examiner — Melvin C. Mayes
Assistant Examiner — Michael Forrest
(74) Attorney, Agent, or Firm — Miller, White, Zelano, Branigan, P.C.

(57) ABSTRACT

The present invention concerns an adsorbent comprising at least one zeolite selected from a zeolite of the 12 MR, 10 MR and 8 MR type and at least one binder comprising a clay with a Si/Al weight ratio of more than 2. It also concerns its preparation process and its use in a process for purifying a hydrocarbon feed comprising unsaturated molecules and at least one impurity comprising at least one heteroatom of the O, S or N type.

7 Claims, No Drawings

ADSORBENT BASED ON A ZEOLITE AND A SILICA-RICH CLAY, AND PROCESS FOR PURIFYING HYDROCARBON FEEDS CONTAINING UNSATURATED MOLECULES

The invention relates to the field of processes for purifying hydrocarbon feeds comprising unsaturated molecules by adsorption onto zeolitic adsorbents in order to eliminate impurities containing heteroatoms contained in those feeds.

The skilled person is aware that molecules containing heteroatoms (oxygen, sulphur, nitrogen, etc.) have a deleterious effect on the function of a large number of industrial catalysts. In fact, those compounds are deposited on the active sites of the catalysts, which are deactivated thereby and are no longer active in catalysing the reaction. As a consequence, many patents recommend extracting those impurities from the cuts upstream of the catalytic reactors.

The most effective technique for extracting such impurities is to use adsorbents having a specific affinity for the impurities. The principle of purification of feeds by adsorption is very simple. The fluid to be purified, for example a mixture of hydrocarbons, is injected into an adsorption column containing an adsorbent disposed in a fixed bed. In the column, the impurities are selectively adsorbed into the solid, which means that a purified cut can be recovered at the outlet. When the solid is saturated, it is regenerated by passing through a desorbent at high temperature. During that phase, the feed is directed towards another adsorption column.

The efficiency of that type of process is greatly dependent on the properties of the solids used. Ideally, such solids must have:
  a high adsorption capacity for the impurities which are to be removed;
  a good regeneration capacity (the impurities must be capable of being desorbed under reasonable temperature conditions);
  a good mechanical strength;
  a service lifetime which is as long as possible. Adsorbents can in fact lose their adsorption capacity over time. As an example, they may not be sufficiently thermally stable and lose their mechanical properties during the high temperature desorption phases. The loss of capacity of the adsorbents may also be brought about by the formation of heavy carbonaceous products (coke) in their pores, causing partial or total clogging of the pores.

The dimensions of the adsorbent used in the fixed beds is also a critical parameter. It is in fact necessary for the adsorbent particles to have a minimum dimension of approximately 0.5 mm in order to limit the pressure drops in the bed.

Regarding purification of the hydrocarbons, zeolitic type adsorbents were long ago identified as solids which perform well. Because of their polarity, they have a very high affinity for molecules containing heteroatoms. Their adsorption capacity for such molecules is thus very high even in the presence of hydrocarbons. It is also possible to regenerate them at temperatures of the order of 300° C., which is perfectly applicable on an industrial scale. Finally, they have very good thermal stability.

It is generally acknowledged that zeolitic adsorbents suffer from a major disadvantage: during successive adsorption-desorption cycles, molecules of coke are formed inside their pores and their adsorption capacity is thus reduced. This phenomenon is all the more critical when the feeds to be treated contain highly reactive molecules, known as coke precursors, such as unsaturated hydrocarbons. It is in fact well known that unsaturated molecules can react together to form oligomers, some of which can be heavy, as well as aromatic and polyaromatic molecules. That type of molecule cannot be extracted from the pores of the zeolites under normal regeneration conditions and will thus hereinafter be known as coke.

When cuts containing unsaturated hydrocarbons are to be purified, this problem is particularly critical, of course. Such cuts contain monounsaturated olefins and may also contain polyunsaturated molecules such as diolefins, which are coke precursors which are even more reactive than monounsaturated olefins. Further, the documents U.S. Pat. No. 3,816,975, U.S. Pat. No. 6,632,766, US2002/0147377, and U.S. Pat. No. 5,271,835 teach that the olefins co-adsorbed with the impurities can oligomerize in the pores of the zeolites, which could be at the origin of the loss of performance of the adsorbents over time.

Further, the impurities themselves might behave in the same manner as the coke precursors. It is well known, for example, that nitriles are highly unstable groups and that mercaptans can react with olefinic molecules to form heavy sulphides.

In order to reduce this loss of adsorption capacity by coking, various solutions have been envisaged. Some proposals concern improving the formulation of the adsorbent in order to render it less reactive. Thus, document U.S. Pat. No. 6,107,535 concerns the extraction of nitriles from a hydrocarbon cut by selective adsorption onto silica gels. The advantage of that type of material is that it has low acidity, which thus means that the formation of gums is avoided.

Other patents propose reducing the quantity of zeolite in the adsorbent. Documents U.S. Pat. No. 5,834,392, U.S. Pat. No. 5,880,052, U.S. Pat. No. 5,858,211 and U.S. Pat. No. 6,019,887 propose the use of adsorbents containing a mixture of non-acidic cationic zeolite and an inorganic oxide type matrix. All those patents also teach us that the inorganic oxide type matrix has to be washed with a basic alkali hydroxide solution, for example sodium hydroxide, in order to neutralize its surface acidity. The solid constituted by a mixture of zeolite and the inorganic matrix washed with an alkali hydroxide is preferably shaped with the aid of a binder, for example Ludox® (colloidal silica). Further, manufacturing this type of solid necessitates many successive steps: washing of the inorganic matrix with the basic alkali hydroxide solution, mixing the inorganic matrix with the zeolite, and finally shaping the ensemble with a binder.

Document U.S. Pat. No. 6,632,766 proposes the use of a shaped adsorbent containing both a zeolite, an alumina, and also a metal, preferably sodium. Adding sodium means that the reactivity of the adsorbent can be reduced and certain acidic compounds such as $CO_2$ and COS can be preferentially adsorbed.

Document EP 0 511 885 claims that it is possible to reduce the reactivity of the adsorbents containing zeolites without in any way reducing their adsorption capacity, by using a kaolin type clay in order to shape the zeolite. The examples in that patent demonstrate that the kaolin generates less coke than the other clays such as bentonite, attapulgite or sepiolite.

Application PCT/FR2012/00443 proposes reducing the quantity of binder of the shaped zeolites as much as possible in order to reduce their reactivity and increase their capacity. That document shows us that, in order for the final solid to have mechanically acceptable strength properties, that type of solid can only be manufactured by including a step for forming a zeolite, which renders the process for shaping more complicated and more expensive.

Further, documents U.S. Pat. No. 2,973,327 and U.S. Pat. No. 6,530,975 describe adsorbents based on zeolites and different clay binders. In those documents, no mention is made of a technical advantage in using one type of clay in particular.

The Applicant has discovered, surprisingly, that using clay with a Si/Al weight ratio of more than 2 to shape the adsorbents means that the reactivity of said adsorbents can be reduced, along with the formation of coke over time, without in any way necessitating the addition of metals or supplemental shaping steps. Thus, the aim of this patent is to propose an adsorbent with a reduced reactivity towards unsaturated molecules comprising a zeolite and a clay with a Si/Al weight ratio of more than 2. In fact, the combination of certain zeolites with a binder comprising a clay with a Si/Al weight ratio of more than 2 is particularly effective in limiting the formation of coke when that adsorbent is brought into contact with a hydrocarbon feed containing unsaturated molecules and impurities comprising heteroatoms. It has in fact been discovered that if the adsorbent comprises a clay with a Si/Al weight ratio of more than 2 as a binder, this limits coke formation better than adsorbents using clays with lower Si/Al weight ratios.

The present invention describes an adsorbent comprising a zeolite and a binder comprising a clay with a Si/Al weight ratio of more than 2 with a reduced reactivity towards unsaturated molecules, and a preparation process which is particularly simple and inexpensive. The present invention also concerns a process for purifying hydrocarbons by adsorption of impurities containing heteroatoms in the presence of unsaturated molecules with the aid of said shaped adsorbent.

More particularly, the present invention pertains to an adsorbent comprising at least one zeolite selected from a zeolite of the 12 MR, 10 MR and 8 MR type and at least one binder comprising a clay with a Si/Al weight ratio of more than 2.

In a variation, the adsorbent comprises in the range 60% by weight to 95% by weight of zeolite and in the range 5% by weight to 40% by weight of binder comprising a clay with a Si/Al weight ratio of more than 2.

In a variation, the binder comprises at least 50% by weight of a clay with a Si/Al weight ratio of more than 2.

Clay-like materials are aluminium phyllosilicates with sheets which are constituted by layers of $Al(OH)_6$ octahedra and layers of $SiO_4$ tetrahedra bonded via common OH groups and O atoms. They are natural products, the composition of which can vary widely depending on the geographical origin of the deposits. Nevertheless, clays can be classified into broad families, as a function of the nature of the layers (alumina octahedra or silica tetrahedra) and the organization of their sheets. Thus, the sheets of clays from the kaolinite family are constituted by 2 superimposed sheets: a layer of alumina octahedra and a layer of silica tetrahedra. The sheets of clays from the smectite family such as montmorillonite, bentonite, nontronite, saponite, alietite, hectorite, saliotite, sauconite or beidellite are constituted by three layers: a layer of alumina octahedra surrounded by two layers of silica tetrahedra. The clays of the illite family have a sheet structure which is close to that of the smectites, but with partial substitution of silicon atoms by aluminium atoms.

The clays of the smectite family are thus richer in silicon atoms, and thus are preferred materials for the binder of the invention.

In a variation, the zeolite is exchanged with cations of elements selected from the alkali elements, the alkaline-earth elements, the lanthanides and transition metals.

In a variation, the zeolite is selected from the group constituted by the zeolites AFI, AFR, BEA, EMT, FAU, LTL and MOR; preferably, said zeolite is a KX or NaX zeolite.

In accordance with another variation, the zeolite is selected from the group constituted by the zeolites LTA, CHR and ERI; preferably, said zeolite is a 3A, 4A or 5A zeolite.

In accordance with one variation, the zeolite contains silicon and an element T selected from the group constituted by aluminium, boron, gallium and iron, and in which the atomic ratio Si/T of the zeolite is less than 20.

In accordance with one variation, the adsorbent of the invention is constituted by a zeolite selected from a zeolite of the type 12 MR, 10 MR and 8 MR and a clay having a Si/Al weight ratio of more than 2.

In accordance with a preferred variation, the zeolite is a NaX zeolite and the binder is constituted by a smectite type clay, preferably of the montmorillonite type.

In accordance with a particularly preferred variation, the adsorbent is constituted by NaX zeolite and a montmorillonite type clay.

The invention also concerns a process for the preparation of said adsorbent, comprising the following steps:
a) mixing at least one zeolite selected from a zeolite of the type 12 MR, 10 MR and 8 MR, at least one binder comprising a clay having a Si/Al ratio by weight of more than 2 and at least one solvent;
b) shaping the mixture obtained in step a);
c) optionally, drying;
d) heat treating the shaped material obtained at the end of step b) or c).

In accordance with a variation of the preparation process, in step a) in the range 60% to 95% by weight of at least one zeolite selected from a zeolite of the type 12 MR, 10 MR and 8 MR, and in the range 5% to 40% by weight of at least one binder comprising a clay having a Si/Al ratio by weight of more than 2 are mixed with at least one solvent, in step b) the mixture obtained in step a) is shaped by extrusion, in step c) drying is carried out at a temperature in the range 25° C. to 200° C., and in step d) a heat treatment is carried out at a temperature in the range 150° C. to 700° C.

The invention also concerns a process for purifying a hydrocarbon feed comprising unsaturated molecules and at least one impurity comprising at least one heteroatom, in which the feed is brought into contact with the adsorbent of the invention.

DETAILED DESCRIPTION OF THE INVENTION

The Adsorbent

The nature of the zeolite can vary, depending on the impurities to be adsorbed. Preferably, the adsorbent of the invention comprises a zeolite with a pore diameter which is sufficiently large so that one or more impurities of the feed can penetrate into the pore network. The term "pore diameter" is routinely used by the skilled person. It is used to define, in a functional manner, the pore size in terms of the size of molecule capable of entering into that pore. It does not denote the actual dimension of the pore, as this is often difficult to determine since it is often irregular in shape (i.e. not circular). In his book entitled "Zeolite Molecular Sieves" (John Wiley and Sons, New York, 1974) on pages 633 to 641, D W Breck provides a discussion on effective pore diameter. The channel sections of the zeolites are rings of oxygen atoms, and so it is also possible to define the pore size of zeolites by the number of oxygen atoms forming the annular section of the rings, denoted by the term "member rings", or MR.

By way of example, the "Atlas of Zeolite Structure Types" (W. M. Meier and D. H. Olson, 4$^{th}$ Edition, 1996) indicates that zeolites with structure type FAU have a network of 12 MR crystalline channels, i.e. the section is constituted by 12 oxygen atoms. This definition is well known to the skilled person and will be used below.

Zeolites characterized by pore diameters of 8 MR allow adsorption of small molecules such as water, COS or $CO_2$ and can be used when this type of molecule has to be extracted selectively. Zeolites characterized by pore diameters of at least 12 MR can be used to allow the adsorption of many impurities and are thus particularly suitable for our application. Zeolites characterized by pore diameters of 10 MR may be used when molecules of intermediate size have to be adsorbed.

The following families: LTA, CHA, ERI can be cited as examples of zeolites characterized by pore diameters of 8 MR.

The following families: MFI, EUO, FER, MEL, MTT can be cited as examples of zeolites characterized by pore diameters of 10 MR.

The following families: AFI, AFR, BEA, EMT, FAU, LTL, MOR can be cited as examples of zeolites containing channels of at least 12 MR.

Advantageously, the zeolites used in the process contain silicon and at least one element T selected from the group formed by aluminium, boron, gallium and iron, preferably aluminium or gallium, and highly preferably aluminium.

The silica content of these adsorbents can vary widely. The atomic ratio Si/T of the zeolite of the invention is preferably less than 20, more preferably less than 15, still more preferably less than 8, and highly preferably less than 6, or even less than 5.

When the element T is aluminium, the atomic ratio Si/Al of the zeolite is preferably less than 8, more preferably less than 6 and highly preferably less than 5, or even less than 4.

The zeolite contained in the adsorbent of the invention is preferably exchanged with cations of elements selected from alkali elements, alkaline-earth elements, lanthanides or transition metals. More preferably, said elements are selected from alkali elements, alkaline-earth elements and lanthanides, still more preferably from alkali elements and alkaline-earth elements, and highly preferably from alkali elements. Of the alkali elements, sodium and potassium are preferred. Of the alkaline-earth elements, barium, magnesium and calcium are preferred. For 12 MR type zeolites, sodium is the highly preferred alkali element.

In a preferred variation of the invention, the zeolite is a type 12 MR zeolite. It is preferably selected from the group constituted by the zeolites AFI, AFR, BEA, EMT, FAU, LTL and MOR. Preferably, it is selected from the family of type FAU zeolites which, inter alia, includes the following zeolites: X zeolite, Y zeolite, LSX zeolite. More preferably, the FAU type zeolite of the invention is an X, Y or LSX zeolite.

Said FAU type zeolite may be exchanged with any alkali or alkaline-earth cation. In a more preferred variation, the adsorbent of the invention comprises a zeolite of type X or Y or LSX exchanged with sodium, potassium or barium. Still more preferably, the adsorbent of the invention comprises a KX, NaX or BaX zeolite. More preferably, the adsorbent of the invention comprises a KX or NaX zeolite, and still more preferably a NaX zeolite.

In another preferred variation of the invention, the zeolite is of the 10 MR type. It is preferably selected from the group constituted by the zeolites MFI, EUO, FER, MEL and MTT.

In accordance with another preferred variation of the invention, the zeolite is of the 8 MR type. It is preferably selected from the family of LTA type zeolites which, inter alia, comprises the following zeolites: zeolite 3A, zeolite 4A, zeolite 5A.

Since the crystal dimensions of zeolite are of the order of magnitude of a few micrometers, it is impossible to use them as-is in industrial adsorbents, because the pressure drops generated would be too high. Thus, it is necessary to shape these crystals in order to form particles with larger dimensions, i.e. of the order of a millimeter. Adding a binder during the shaping step is thus necessary.

In the context of the invention, the term "binder" is used for any material added to the zeolite in order to shape it; it is not eliminated during the drying and heat treatment steps.

The quantity of binder of a shaped zeolitic solid is thus the quantity by weight of all materials other than the zeolite. The binder and the zeolite taken in combination thus represent 100% of the zeolitic solid (also termed the adsorbent) which has been shaped.

In order to obtain an adsorbent with the desired properties, namely reduction of the reactivity of said adsorbents and thus reduction in the formation of coke over time, the choice of binder is particularly important. In fact, the Applicant has discovered that the presence of a binder comprising a clay with a Si/Al weight ratio of more than 2 in the adsorbent can be used to obtain an adsorbent which is particularly resistant to the deposition of coke, while maintaining good adsorption functions compared with adsorbents comprising other clays with lower Si/Al weight ratios.

Preferred clays with a Si/Al weight ratio of more than 2 are smectites such as montmorillonite, bentonite, nontronite, saponite, alietite, hectorite, saliotite, sauconite and beidellite. Preferably, the clay having a Si/Al ratio by weight of more than 2 is of the montmorillonite type.

Preferably, the binder comprises at least 50% by weight, preferably at least 80% by weight and particularly preferably at least 95% by weight of a clay having a Si/Al weight ratio of more than 2. Still more preferably, the binder comprises at least 50% by weight, preferably at least 80% by weight and particularly preferably at least 95% by weight of a smectite type clay, still more preferably of the montmorillonite type. Particularly preferably, the binder is constituted by a montmorillonite type clay.

It is possible to use pure or impure sources of clays containing these types of clay. In fact, since clays are natural products, they are often accompanied by other phases, frequently quartz. They may be used alone or as a mixture.

The adsorbent of the invention is primarily composed of zeolitic crystals. In a variation, the adsorbent comprises in the range 60% by weight to 95% by weight, preferably in the range 70% by weight to 95% by weight, more preferably in the range 75% by weight to 95% by weight of zeolite and in the range 5% by weight to 40% by weight, preferably in the range 5% by weight to 30% by weight, more preferably in the range 5% by weight to 25% by weight of binder comprising a clay with a Si/Al weight ratio of more than 2.

In a variation, the adsorbent of the invention is constituted by a zeolite selected from a zeolite of type 12 MR, 10 MR and 8 MR and a clay with a Si/Al weight ratio of more than 2.

In a preferred variation, the zeolite is a NaX zeolite and the binder is a smectite type clay, preferably of the montmorillonite type.

In a particularly preferred variation, the adsorbent is constituted by NaX zeolite and a montmorillonite type clay.

The adsorbents of the invention also have mechanical properties compatible with an industrial use. In particular, said materials of the invention have a mechanical strength, measured by the average crush strength test hereinafter denoted ACS, of at least more than 0.4 daN/mm, preferably at least more than 0.9 daN/mm and more preferably at least more than 1 daN/mm.

The term "lateral crush strength" means the mechanical strength of a material in accordance with the invention determined by the average crush strength test (ACS). It is a standardized test (standard ASTM D4179-01), which consists of subjecting a material in the form of a millimetric object such as a bead, a pellet or an extrudate to a compressive force generating rupture. Thus, this test is a measurement of the tensile strength of the material. The analysis is repeated over a certain number of solids taken individually, typically over a number of solids in the range 10 to 200. The mean of the lateral break forces measured constitutes the average ACS which is expressed in the case of granules in units of force (N) and in the case of extrudates in units of force per unit length (daN/mm or decaNewton per millimeter of extrudate length).

Preparation Process

The present invention also concerns a process for the preparation of said adsorbent in accordance with the invention, comprising the following steps:

a) mixing at least one zeolite selected from a zeolite of the type 12 MR, 10 MR and 8 MR, at least one binder comprising a clay having a Si/Al ratio by weight of more than 2 and at least one solvent;

b) shaping the mixture obtained in step a);

c) optionally, drying;

d) heat treating the shaped material obtained at the end of step b) or c).

Step a):

In accordance with the invention, said step a) consists of mixing at least one zeolite selected from a zeolite of the type 12 MR, 10 MR and 8 MR with at least one binder comprising a clay having a Si/Al ratio by weight of more than 2 and at least one solvent.

Preferably, in the range 60% to 95% by weight, preferably in the range 70% to 95% by weight and more preferably in the range 75% to 95% by weight of at least one zeolite selected from a zeolite of the type 12 MR, 10 MR and 8 MR, and in the range 5% to 40% by weight, preferably in the range 5% to 30% by weight and more preferably in the range 5% to 25% by weight of at least one binder comprising a clay having a Si/Al weight ratio of more than 2 are mixed with at least one solvent.

The percentages by weight are expressed with respect to the total quantity of solid materials introduced (zeolite and binder) into said step a). A pasty mixture is obtained.

Said zeolite, used in the powder form in the process for the preparation of the adsorbent of the present invention and the binder, also used in the powder form, are described above.

Said solvent is advantageously selected from water, alcohols, preferably selected from ethanol and methanol, and amines. It is also possible to use a mixture of said solvents. Preferably, the solvent is water.

In the context of the invention, it is entirely envisageable to mix several different zeolites and/or clay binders and/or solvents.

The order in which the zeolite, binder and solvent are mixed is irrelevant. The zeolite, binder and solvent may advantageously be mixed in a single step. The zeolite, binder and solvent may also advantageously be added in alternation.

In one preferred embodiment, the zeolite and the binder are first pre-mixed in the dry form before introducing the solvent.

Said pre-mixed powders are then advantageously brought into contact with the solvent. In another embodiment, the zeolite and binder may be added sequentially with interspersed additions of solvent.

Preferably, said mixing step a) is carried out by mixing, in batch mode or in continuous mode. In the case in which said step a) is carried out in batch mode, said step a) is advantageously carried out in a mixer, preferably equipped with a Z arm or cam arm, or in any other type of mixer such as a planetary mixer, for example. Said mixing step a) can be used to obtain a homogeneous mixture of powdered constituents and solvent.

Step b):

In accordance with the invention, said step b) consists of shaping the mixture obtained in step a).

The mixture obtained in step a) may be shaped using any shaping technique known to the skilled person, such as extrusion, granulation or pelletization. It is preferably formed by extrusion.

During the shaping step, organic additives may be added to the mixture of binder and zeolite in order to facilitate agglomeration or to improve the mechanical strength of the particles. Said organic additive may advantageously be selected from methylcellulose, hydroxypropylmethylcellulose, hydroxyethylcellulose, carboxymethylcellulose, microcrystalline cellulose and polyvinyl alcohol, or by any organic additive which is well known to the skilled person. The proportion of said organic additive is advantageously in the range 0 to 20% by weight, preferably in the range 0 to 10% by weight and more preferably in the range 0 to 7% by weight with respect to the total mass of said material.

This additive will be eliminated during the heat treatment of step d) of the preparation process of the invention.

Said step b) is advantageously carried out in a piston, single-screw or twin screw extruder.

In this case, an additive may optionally be added to mixing step a). The presence of said additive facilitates shaping by extrusion.

In the case in which said preparation process is carried out continuously, said mixing step a) may be coupled with step b) for shaping by extrusion in the same equipment. In this embodiment, extrusion of the mixture also known as the "mixed paste" may be carried out either by directly extruding from the end of the continuous twin screw type mixer for example, or by connecting up one or more batch mixers to an extruder. The geometry of the die which provides the extrudates with their shape may be selected from dies which are well known to the skilled person. They may therefore be in the cylindrical, multilobed, channeled or slotted shape, for example.

In the case in which the mixture obtained from step a) is shaped by extrusion, the quantity of solvent added to mixing step a) is adjusted so as to obtain, at the end of this step and irrespective of the variation employed, a mixture or a paste which does not flow but which is also not too dry, in order to allow it to be extruded under suitable pressure and temperature conditions which are well known to the skilled person and are dependent on the extrusion equipment used.

Step c):

Step c) is an optional drying step. This step is preferably carried out at a temperature in the range 25° C. to 200° C., preferably in the range 80° C. to 150° C. The drying period is generally in the range 1 h to 72 h.

Said drying step may advantageously be carried out in air or in an inert gas. Preferably, said drying step is carried out in air.

Said drying step may be integrated with heat treatment step d) by providing for a temperature ramp-up into which a constant temperature stage at an intermediate temperature is integrated.

Step d):

In accordance with the invention, said step d) consists of a step for heat treatment of the shaped material obtained at the end of step b) or c). This step is preferably carried out at a temperature in the range 150° C. to 700° C., preferably in the range 300° C. to 650° C. and more preferably in the range 450° C. to 550° C. The duration of the heat treatment is generally in the range 1 minute to 72 hours, preferably in the range 30 minutes to 72 h, more preferably in the range 1 h to 48 h and more preferably in the range 1 to 12 h.

Said heat treatment step may advantageously be carried out in air, in an inert gas or under vacuum. Preferably, said heat treatment step is carried out in air.

At the end of the process for the preparation of the adsorbent of the invention, the adsorbent obtained is in the form of extrudates with a dimension in the range 0.8 to 5 mm, preferably in the range 0.9 to 4 mm.

However, said adsorbents obtained are not excluded from then, for example, being introduced into equipment allowing their surfaces to be rounded, such as a bowl granulator or any other equipment allowing them to be spheronized. This step used to obtain spheroidal objects such as beads can be carried out at the end of step b), c) or d).

Said preparation process of the invention can be used to obtain adsorbents in accordance with the invention with mechanical strength values, measured by crush strength measurements, of more than 0.4 daN/mm, preferably more than 0.9 daN/mm and more preferably more than 1 daN/mm, irrespective of the quantity of zeolite employed.

Purification Process

The present invention also concerns a process for purifying a hydrocarbon feed comprising unsaturated molecules and at least one impurity comprising at least one heteroatom, in which the feed is brought into contact with the adsorbent of the invention.

The hydrocarbon feeds concerned by the present invention contain unsaturated molecules. They may be olefinic molecules containing one or more double bonds or cyclic aromatic molecules. In general, the process of the invention can be used to treat a hydrocarbon feed comprising olefins (i.e. hydrocarbon molecules comprising a double bond between two carbon atoms) and optionally diolefins (i.e. hydrocarbon molecules comprising at least two double bonds between two carbon atoms). There are no restrictions concerning the number of carbon atoms of the molecules contained in these feeds, the only condition being that the feeds must be liquid or gaseous at ambient temperature, in order to allow flow in the beds of adsorbents.

The feeds treated by the purification process of the invention may be cuts obtained from fluid catalytic cracking (FCC), cuts obtained from steam cracking, or MTBE raffinates. Preferred feeds treated by the purification process of the invention are cuts obtained from FCC, more particularly $C_3$-$C_4$ type FCC cuts or $C_5$-$C_6$ type FCC cuts.

The concentrations of unsaturated molecules in the feeds of the invention may vary very widely. In fact, since unsaturated molecules are more polar than saturated hydrocarbons, they are preferentially adsorbed onto the zeolitic adsorbents and thus can cause the formation of coke even if they are in a low concentration in the feed.

The hydrocarbon feed treated in the process of the invention contains one or more impurities to be eliminated. The impurities contained in the feeds contain at least one heteroatom such as oxygen, nitrogen or sulphur. Examples of impurities contained in the feeds are nitriles, ketones, mercaptans, ethers and alcohols.

Depending on the nature of the feed to be purified, the nature and the concentration of the impurities can vary extremely widely.

Thus, for $C_3$-$C_4$ type FCC cuts, the main impurities are generally water, acetonitrile, acetone, methyl- and ethyl-mercaptan, DMDS and COS. For MTBE raffinates, the main impurities are generally methyl- and ethyl-mercaptan, DMDS and DEDS, acetonitrile, acetone, methanol, ethanol, MTBE, TBA and DME. For $C_4$ cuts from steam crackers, the main impurities are generally methyl- and ethyl-mercaptan, DMDS and DEDS, acetonitrile, DMF, NMP and acetone. For $C_5$-$C_6$ FCC cuts, the main impurities are $C_1$-$C_3$ mercaptans, thiophene, $C_2$-$C_4$ nitriles and pyrrole.

The feeds for the processes of the invention may contain varying quantities of polyunsaturated olefins. In particular, it is optionally possible to place the process of the invention downstream of a selective hydrogenation process in order to reduce the quantity of polyunsaturated olefins in the feed.

The principle of the process for purification by adsorption of a hydrocarbon feed comprising unsaturated molecules and at least one impurity comprising at least one heteroatom is very simple. The fluid to be purified, for example a mixture of hydrocarbons, is injected into an adsorption column containing the adsorbent generally disposed in a fixed bed. In the column, the impurities are selectively adsorbed into the solid, which means that a purified cut can be recovered from the outlet. When the solid is saturated, it is regenerated by circulating a desorbent at high temperature. During this phase, the feed is directed towards another adsorption column.

In a variation, it is also possible to use two or more beds or reactors in series and/or in parallel containing the adsorbent of the invention.

In the process of the invention, the adsorbent can preferably be used in fixed bed mode. In a preferred variation, it is possible to use the adsorbent of the invention by carrying out the following steps in succession:

a) supplying a feed of hydrocarbons comprising unsaturated molecules and at least one impurity comprising at least one heteroatom;

b) causing the feed to move through a fixed bed containing at least one shaped adsorbent in accordance with the invention;

c) recovering the purified feed at the outlet from the fixed bed;

d) bringing the adsorbent into contact with a regenerating fluid in order to at least partially desorb the impurities containing heteroatoms.

Next, steps b) to d) are carried out again.

In a variation of the process of the invention, the adsorbent of the invention can be employed using the Pressure Swing Adsorption (PSA) technique.

In accordance with a preferred variation of the process of the invention, the adsorbent is employed using the Temperature Swing Adsorption (TSA) technique. This process comprises various steps:

a) an adsorption step: the feed is injected into the bed of adsorbent and the impurities are adsorbed into the bed, the purified feed leaves the column. This step is carried out at a temperature in the range 15° C. to 150° C., preferably in the range 20° C. to 50° C.;

b) a step for displacement of the feed by the desorbent: injection of the feed into the column is stopped and desorbent is injected. The desorbent displaces the feed present in the dead volumes of the column (interstitial and macro/mesoporous volumes). This step is carried out at the same temperature as step a);

c) a step for heating the bed of adsorbent by the desorbent to a final temperature in the range 200° C. to 400° C., preferably in the range 250° C. to 350° C. During this step, the impurities are desorbed from the adsorbent;

d) a cooling step: gradually dropping the temperature in the column by injecting desorbent until the adsorption temperature is reached;

e) a step for filling the column with the feed: desorbent injection is stopped and feed is injected into the column. The column is ready for an adsorption step a).

This cycle is only given by way of example and the process of the invention may also encompass supplemental steps, including intermediate steps located between steps a) to e).

Depending on the composition of the feeds to be treated, it may be advantageous to use the adsorbent of the invention in combination with other adsorbents. As an example, when the feed contains water, it is possible to place, in the column, a first layer of alumina in order to extract water, followed by a second layer of adsorbent in accordance with the invention in order to extract the other impurities. Similarly, when the feed contains nitrogen-containing and sulphur-containing molecules, the sulphur-containing molecules, which are less selectively adsorbed in the zeolites, have a tendency to be displaced by the nitrogen-containing molecules. It may then be advantageous to place a layer of adsorbent which is selective for sulphur-containing molecules upstream of the layer of adsorbent in accordance with the invention.

Depending on the composition of the feeds to be treated, it may be advantageous to use the process of the invention in combination with other purification techniques. In particular, it is possible to wash the feed with water upstream of the process for purification by adsorption in accordance with the invention. In fact, certain polar impurities contained in the hydrocarbon cuts may be captured to a large extent in the water extraction columns and it may be of economic advantage to couple the two techniques together.

Examples

NaX zeolite extrudates were synthesized as follows:

Zeolite and binder powders were introduced into the chamber of the mixer (Plastograph, Brabender) and deionized water was added, using a syringe, for approximately 2 minutes, with mixing. The mixture was then mixed for 20 minutes at 25 rpm.

The paste obtained was then extruded (piston extruder) through a cylindrical die with a diameter of 1.8 mm. The rods were finally dried overnight at 80° C. and calcined in air at 550° C.

For comparison, Examples A to F were provided with various clay or oxide type binders prepared using the same procedure (Table 2). The Si/Al weight ratio of the various binders and their quantities of various impurities are shown in Table 1 below.

TABLE 1

Nature of binder, Si/Al weight ratio, impurities

| Nature of binder | Si/Al | K* | Na (µg/g) | Fe* | Mg* | Ca* | S* | Ti* |
|---|---|---|---|---|---|---|---|---|
| Montmorillonite, Gelclay ® | 2.56 | 0.48 | 1.9 | 3.72 | 1.34 | 4.48 | 0.32 | 0.48 |
| Montmorillonite, Wittgert ® | 3.17 | 0.83 | 0 | 6.5 | 1.1 | 1.1 | 0.01 | 1.4 |
| Montmorillonite, Sigma ® | 4.39 | 1.3 | 0 | 1.92 | 0.88 | 0.23 | 0.01 | 0.26 |
| Alumina | 0 | 0 | 1250 | 0 | 0 | 0 | 0 | 0 |
| Provins RR40 ® clay | 1.2 | 0.02 | 118 | 1.21 | 0.02 | 0.42 | 0.13 | 1 |
| Clayrac BS21 ® clay | 1.2 | 0.52 | 359 | 0.71 | 0 | 0.07 | 0.02 | 0.75 |

*% by weight

The reactivity of the adsorbents was then tested as follows. Firstly, they were activated in nitrogen at 400° C. for 2 hours. 100 mg of adsorbent was then transferred into a flask (of the vial type) containing 250 mL of pentadiene. The solid was kept in contact with the pentadiene for 15 hours. Next, approximately 30 mg of solid was removed from said flask and placed in the crucible of a SETARAM thermobalance in a 3 NL/h stream of helium.

A temperature programme was then applied to the balance and at the same time, the loss of mass of the sample was measured. Initially, the temperature was kept at 30° C. for 60 minutes in order to evaporate off the pentadiene condensed in the macropores. The sample was then heated to 500° C. with a temperature ramp-up of 5° C./minute, then held at 500° C. for 30 minutes. Still maintaining this same temperature, a gas which was composed of half and half helium and air was then injected into the thermobalance for a period of 2 hours in order to burn off the residual carbon.

Throughout the experiment, the gaseous effluent leaving the thermobalance was analysed by mass spectrometry, which allowed the drop in mass caused by desorption of the pentadiene to be differentiated from that caused by desorption or burning of the coke. Finally, the reactivity of the solid was evaluated by calculating the percentage by weight of coke with respect to the total desorbed mass. The results are detailed in Table 2 below.

TABLE 2

NaX zeolite adsorbents and different binder, as well as their coke content

| Designation of solid | Nature of zeolite | % by weight of zeolite | Nature of binder | % by weight of binder | Coke content (% by weight) |
|---|---|---|---|---|---|
| A | NaX | 80 | Montmorillonite, Gelclay ® | 20 | 29.3 |
| B | NaX | 80 | Montmorillonite, Wittgert ® | 20 | 34.1 |
| C | NaX | 80 | Montmorillonite, Sigma ® | 20 | 52.1 |
| D | NaX | 80 | alumina | 20 | 75.1 |
| E | NaX | 80 | Provins RR40 ® clay | 20 | 72.7 |
| F | NaX | 80 | Clayrac BS21 ® clay | 20 | 67.9 |

It will be seen that, independently of the quantity of impurities, the adsorbents shaped with a binder with a Si/Al weight ratio of more than 2 in accordance with the invention (solids A, B and C) generate much less carbon than the other adsorbents with a lower Si/Al ratio (solids D, E and F).

The entire disclosures of all applications, patents and publications, cited herein and of corresponding French Application No. 13/55341, filed Jun. 10, 2013 are incorporated by reference herein.

The invention claimed is:

1. An adsorbent comprising at least one zeolite selected from a KX or NaX zeolite and a clay binder consisting of 100% montmorillonite with a Si/Al weight ratio of more than 2.

2. The adsorbent according to claim 1, in which the adsorbent comprises in the range 60% by weight to 95% by weight of zeolite and in the range 5% by weight to 40% by weight of the clay binder.

3. The adsorbent according to claim 1, in which the zeolite contains silicon and an element T selected from the group constituted by aluminium, boron, gallium and iron, and in which the atomic ratio Si/T of the zeolite is less than 20.

4. The adsorbent according to claim 1, wherein the zeolite is a NaX zeolite.

5. A process for the preparation of an adsorbent as claimed in claim 1, comprising the following steps:

a) mixing at least one zeolite selected from a KX or NaX zeolite, at least one binder comprising a clay having a Si/Al ratio by weight of more than 2 and at least one solvent;

b) shaping the mixture obtained in step a);

c) optionally, drying;

d) heat treating the shaped material obtained at the end of step b) or c).

6. The preparation process according to claim 5, in which:

in step a), in the range 60% to 95% by weight of zeolite, and in the range of 5% to 40% by weight of at least one binder comprising a clay having a Si/Al ratio by weight of more than 2 are mixed with at least one solvent, in step b), the mixture obtained in step a) is shaped by extrusion, in step c), drying is carried out at a temperature in the range 25° C. to 200° C., and in step d), a heat treatment is carried out at a temperature in the range 150° C. to 700° C.

7. A process for purifying a hydrocarbon feed comprising unsaturated molecules and at least one impurity comprising at least one heteroatom, in which the feed is brought into contact with the adsorbent according to claim 1.

* * * * *